(12) United States Patent
Haines

(10) Patent No.: US 11,104,052 B2
(45) Date of Patent: Aug. 31, 2021

(54) INCREASED RUBBER-TO-NYLON ADHESION BY OZONE TREATMENT

(71) Applicant: ContiTech Schlauch GmbH, Hannover (DE)

(72) Inventor: Bradley James Haines, Sun Prairie, WI (US)

(73) Assignee: ContiTech Schlauch GmbH, Hannover (DE)

( * ) Notice: Subject to any disclaimer, the term of this patent is extended or adjusted under 35 U.S.C. 154(b) by 109 days.

(21) Appl. No.: 16/562,535

(22) Filed: Sep. 6, 2019

(65) Prior Publication Data

US 2020/0079001 A1 Mar. 12, 2020

Related U.S. Application Data

(60) Provisional application No. 62/728,109, filed on Sep. 7, 2018.

(51) Int. Cl.

| | |
|---|---|
| *B29C 48/14* | (2019.01) |
| *B29C 48/09* | (2019.01) |
| *B29C 48/21* | (2019.01) |
| *B32B 1/08* | (2006.01) |
| *B32B 25/04* | (2006.01) |

(Continued)

(52) U.S. Cl.
CPC ............ *B29C 48/146* (2019.02); *B29C 48/09* (2019.02); *B29C 48/21* (2019.02); *B29C 48/34* (2019.02); *B32B 1/08* (2013.01); *B32B 25/042* (2013.01); *F16L 11/086* (2013.01); *B32B 2597/00* (2013.01)

(58) Field of Classification Search
CPC ....... B29C 48/146; B29C 48/09; B29C 48/21; B29C 48/34; B32B 1/08; B32B 25/042; B32B 2597/00; F16L 11/086
See application file for complete search history.

(56) References Cited

U.S. PATENT DOCUMENTS

| | | | | |
|---|---|---|---|---|
| 2,410,623 | A | * | 11/1946 | Ballard .................... C08G 6/02 |
| | | | | 525/495 |
| 2,824,024 | A | * | 2/1958 | Chapman ................. C08J 7/042 |
| | | | | 428/419 |

(Continued)

*Primary Examiner* — Craig M Schneider
*Assistant Examiner* — David R Deal
(74) *Attorney, Agent, or Firm* — Gregory Adams; David L. Cate

(57) ABSTRACT

An arrangement includes an extruder crosshead, and an innermost rubber tube having an input portion a resident portion residing in the extruder crosshead, and an output portion. The arrangement further includes an ozone stream evolved from an ozone source, where the ozone stream is introduced into an ozone cavity of the extruder crosshead, and a continuous molten barrier forming material which is movable through a flow cavity in the extruder crosshead. A portion of the continuous molten barrier forming material which is emitted from the extruder crosshead is exposed to the ozone stream on an inner side of the portion to provide a heterogeneous surfaced barrier layer. The arrangement also includes a barrier coated rubber tube including the heterogeneous surfaced barrier layer and the output portion of the innermost rubber tube, where the heterogeneous surfaced barrier layer is disposed outward from the output portion of the innermost rubber tube.

16 Claims, 3 Drawing Sheets

(51) Int. Cl.
*F16L 11/08* (2006.01)
*B29C 48/34* (2019.01)

(56) References Cited

U.S. PATENT DOCUMENTS

| | | | | |
|---|---|---|---|---|
| 2,982,457 | A * | 5/1961 | D Alelio | B29D 23/001 |
| | | | | 229/4.5 |
| 3,198,692 | A * | 8/1965 | Bridgeford | B32B 27/00 |
| | | | | 428/420 |
| 3,205,093 | A * | 9/1965 | Lynch | C08J 7/043 |
| | | | | 428/494 |
| 3,928,664 | A * | 12/1975 | Tarney | C08J 7/043 |
| | | | | 427/322 |
| 4,370,187 | A * | 1/1983 | Katagiri | B29C 48/307 |
| | | | | 156/244.23 |
| 6,261,657 | B1 | 7/2001 | Ainsworth et al. | |
| 6,941,975 | B2 | 9/2005 | Wilson et al. | |
| 7,478,654 | B2 | 1/2009 | Haines | |
| 7,504,151 | B2 | 3/2009 | Emad et al. | |
| 7,614,428 | B2 | 11/2009 | Henry et al. | |
| 10,723,097 | B2 * | 7/2020 | Hirose | B32B 23/04 |
| 2004/0060642 | A1 * | 4/2004 | Inaba | B29C 48/495 |
| | | | | 156/166 |
| 2007/0036992 | A1 * | 2/2007 | Tanaka | C09J 7/401 |
| | | | | 428/447 |
| 2007/0048475 | A1 | 3/2007 | Haines | |
| 2007/0135601 | A1 * | 6/2007 | Diakoumakos | C08F 4/58 |
| | | | | 526/195 |
| 2014/0116562 | A1 | 5/2014 | Haines et al. | |
| 2015/0075665 | A1 | 3/2015 | Henry | |
| 2020/0071453 | A1 * | 3/2020 | Mizuta | C08G 59/027 |
| 2020/0109314 | A1 * | 4/2020 | Merrill | B32B 15/082 |

* cited by examiner

INCREASED RUBBER-TO-NYLON ADHESION BY OZONE TREATMENT

REFERENCE TO RELATED APPLICATION

This application claims the benefit of U.S. Provisional Application No. 62/728,109, filed Sep. 7, 2018, the contents of which are incorporated by reference in their entirety.

FIELD

The field to which the disclosure generally relates is a hose suitable for use in refrigerant systems such as vehicle, industrial, and residential refrigerant systems, such as automotive air conditioning systems. The hose is a combination of elastomeric materials to provide flexibility and thermoplastic materials to provide sufficiently low permeability, with layers having improved adhesion.

BACKGROUND

This section provides background information to facilitate a better understanding of the various aspects of the disclosure. It should be understood that the statements in this section of this document are to be read in this light, and not as admissions of prior art.

Hoses are used for transporting refrigerants in vehicle air conditioning systems, as well as industrial and residential refrigerant systems. Such hoses serve the purpose of joining the principal operating components of the refrigerating device. The hoses are typically designed to have good flexibility, high strength, the ability to bend to small radii without kinking, and to maintain impermeability to the fluids resident therein.

In car air-conditioning installations, Freon hoses, which are made of the highest quality rubber compounds, are typically used. Such hoses commonly have a thin layer of nylon (polyamide) in the inner layer of synthetic rubber (barrier type) to reduce Freon permeation down to the minimum. The hoses are manufactured in compliance with standards, such as SAE J2064. The typical Freon hoses used in vehicles have inner diameters of 8, 10, 13 and 16 mm as well as a textile reinforcement.

There are two common Freon hose versions manufactured; a thick wall standard version, and –LW version with a thinner wall. Hoses of bigger sizes (with inner diameters 22, 28 or 35 mm) usually have steel braid and are used in larger installations (e.g. in buses). The working pressure of Freon hoses is usually up to 35 bar, and at temperatures from −40° C. to +135° C.

Such air conditioning 'barrier hose' tubes can be generally described as a sandwich of (1) inner rubber layer, (2) nylon layer, and (3) rubber layer. As nylon commercial products have become modified for improved heat resistance and/or oil/refrigerant compatibility, they become increasingly difficult in adherence to rubber layers. These new products can also be more difficult when using traditional adhesion promoters to obtain and maintain sufficient adhesion over the life of the product. The underlying cause of such issues are lower surface energy of the modified nylon products which makes difficult to have sufficient adherence between the (2) nylon layer and the (1) inner rubber. Also, reactive modifiers, antioxidants or other stabilizers can interfere with the adhesion promoters in the rubber to reduce the chemically bonding of the rubber to the nylon surface.

Thus, there is an ongoing need for air conditioning barrier hoses constructed in such way that the adherence of the inner rubber tube and nylon layer is sufficient over the life of such hoses, such need met, at least in part, with embodiments according to the following disclosure.

SUMMARY

This section provides a general summary of the disclosure, and is not a necessarily a comprehensive disclosure of its full scope or all of its features.

In some aspects of the disclosure, an arrangement for producing hose includes an extruder crosshead, and an innermost rubber tube having an input portion a resident portion residing in the extruder crosshead, and an output portion. The arrangement further includes an ozone stream evolved from an ozone source, where the ozone stream is introduced into an ozone cavity of the extruder crosshead, and a continuous molten barrier forming material which is movable through a flow cavity in the extruder crosshead. A portion of the continuous molten barrier forming material which is emitted from the extruder crosshead is exposed to the ozone stream on an inner side of the portion to provide a heterogeneous surfaced barrier layer. The arrangement also includes a barrier coated rubber tube including the heterogeneous surfaced barrier layer and the output portion of the innermost rubber tube, where the heterogeneous surfaced barrier layer is disposed outward from the output portion of the innermost rubber tube. In some cases, the ozone source is an ozone generator or ozone stored in a cylinder. Also, in some cases the continuous molten barrier forming material is based upon a polyamide material. The barrier coated rubber tube may be polyamide coated rubber tube.

Generally, the heterogeneous surfaced barrier layer has an inner surface and an outer surface, and the inner surface has a first surface energy which is higher than a second surface energy which is on the outer surface.

The barrier coated rubber tube may further include a tie layer disposed on the outer surface of the coated rubber tube. Further, the barrier coated rubber tube may include a reinforcing layer disposed upon the tie layer. Also, the barrier coated rubber tube may have a cover layer disposed outward from the reinforcing layer.

Some other aspects of the disclosure are barrier hoses having an innermost rubber tube, a barrier layer surrounding the innermost rubber tube, where the barrier layer has an inner surface and an outer surface, and where the inner surface has a first surface energy which is higher than a second surface energy which is on the outer surface. A cover layer which is disposed outward from and proximate to the barrier layer. In some cases, a tie layer is disposed adjacent the barrier layer and inward from the cover layer, and a reinforcing layer may be placed between the tie layer and the cover layer. In some cases, the inner surface of the barrier layer is exposed to ozone to provide the first surface energy which is higher than the second surface energy.

In yet other aspects of the disclosure, a hose includes an innermost rubber tube, a barrier layer surrounding the innermost rubber tube, where the barrier layer is a heterogeneous surfaced barrier layer, a cover layer which is disposed outward from and proximate to the barrier layer, a tie layer which is disposed adjacent the barrier layer and inward from the cover layer, and a first reinforcing layer between the tie layer and the cover layer.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
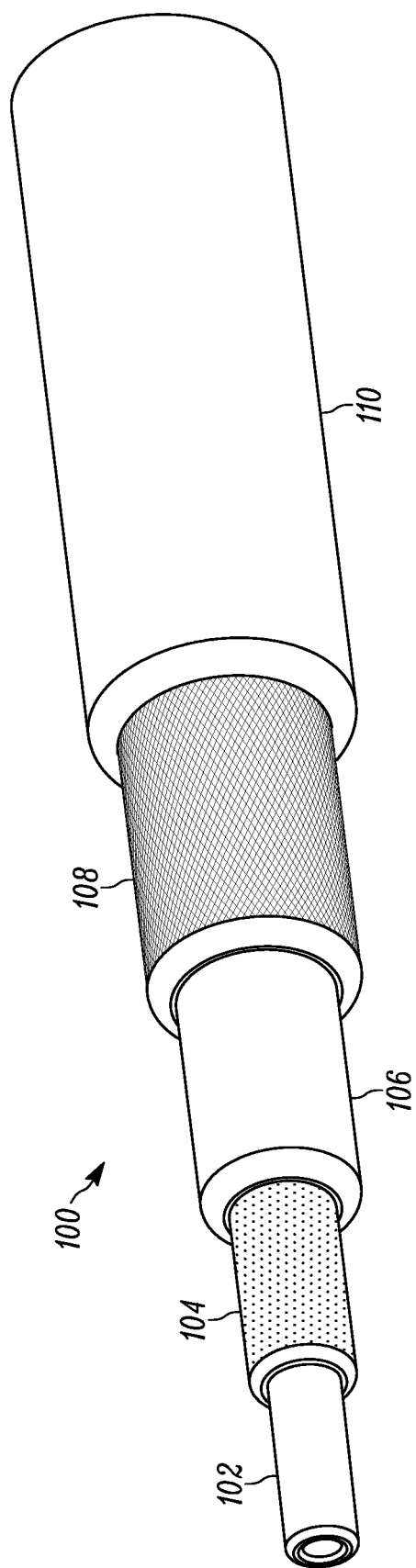
FIG. 1 illustrates a barrier hose in a cut away perspective view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Hose embodiments according to the disclosure generally include a polyamide barrier layer, at least one reinforcement layer, an optional other reinforcement layer or layers, optional tie layer or layers, an outer cover, and an innermost rubber tube. In accordance with the disclosure, the outer surface of the innermost rubber tube and the inner surface of the polyamide barrier are exposed to ozone prior to being adhered together. Accordingly, the ozone serves to oxidize the inner surface of the polyamide, thus increasing the surface energy of the inner surface of the polyamide, which in turn promotes stronger adhesive bonding between the outer surface of the innermost rubber tube and the inner surface of the polyamide barrier. Thus, hose embodiments according to the disclosure incorporate a polyamide barrier layer with an inner surface which is oxidized, having increased surface energy, while the outer surface of such polyamide barrier layer may have a comparatively lower surface energy. A polyamide barrier layer having opposing surfaces with such diverse surface energy properties may be considered a heterogeneous surfaced polyamide layer.

For ease of understanding the innermost tube is shown as the innermost layer or tube of a hose. However, it is appreciated that the innermost tube can also be an inner layer/tube of a hose and not the most innermost tube or layer.

The thickness of the differing layers of the barrier hose may be linked to the desired characteristics, as excessively thin wall thicknesses or excessively thick wall thicknesses present flexibility or kinking problems or coupling compatibility problems of the final hose composite. Such hoses will typically have an inside diameter which is within the range of about 5 mm to about 30 mm. In many cases the hoses of this disclosure will have an inside diameter which is within the range of about 6 mm to about 25 mm. In some aspects, the wall thickness of the hose is within the range of 2.72 mm and 3.73 mm. But, as every incremental thickness of the hose decreases the desired properties of the hose, the smallest wall thickness, without a loss of impermeability and creation of kinking problems, is preferred. The preferred wall thickness for a 13 mm ID hose of this invention is normally within the range of about 2.5 mm to 3.5 mm and will typically be about 3.17 mm.

According to some aspects of the disclosure, the barrier hose has an innermost rubber tube and optional rubber tie layer(s) formed from any suitable material, or materials, including, but not limited to various elastomers such as polychloroprene (CR), ethylene propylene rubber (EPM), ethylene propylene diene terpolymer (EPDM), chlorinated polyethylene (CPE), acrylonitrile butadiene rubber (NBR), hydrogenated acrylonitrile butadiene rubber (HNBR), butyl rubber (IIR), chlorobutyl rubber (CIIR), bromobutyl rubber (BIIR), isobutylenepara-methyl styrene rubber (BIMS), ethylene acrylic elastomer (AEM), as well as blends thereof. In some embodiments, bromobutyl rubber (BIIR) is a useful material for the innermost rubber tube and optional rubber tie layer(s). In some aspects, the innermost rubber tube will typically have a thickness which is within the range of 0.025 inch (0.635 mm) to 0.030 inch (0.762 mm). When used, the tie layer(s) may typically be from 0.02 inch (0.508 mm) to 0.05 inch (1.27 mm) thick.

Materials forming the barrier layer materials may include neat, and/or heat stabilized and/or impact modified and/or toughened and/or plasticized and/or otherwise modified grades of materials. Some suitable materials include, but are not limited to polyamides such as PA6, PA66, copolymers of PA6 and PA66, PA MXD6, PA9T, PA610, PA612, as well as other high barrier plastics including ethylene vinyl alcohol (EVOH), poly(glycolic acid) (PGA), and the like. In some embodiments, highly modified, heat stabilized PA6 is a useful material for the barrier layer. In some aspects, the barrier layer may typically have a thickness from 0.002 inch (0.05 mm) to 0.01 inch (0.254 mm) thick. For instance, in many cases the barrier layer will be from 0.003 inch (0.0762 mm) to 0.005 inch (0.127 mm) thick.

When incorporated into hoses of the disclosure, the reinforcing layer may be formed by braiding, spiraling, knitting, or helical knitting of yarn. The yarn may be selected from conventional hose reinforcing yarns, such as glass, cotton, polyester, polyaramid, nylon, polyvinyl alcohol fibers, and the like, or a blend of any of these fibers. The reinforcing layer in the hose of this invention is typically a polyester or aramid fabric which is woven in a 1-over/1-under pattern. In some embodiments of this disclosure, polyester fabric is useful in forming the reinforcement, such as polyethylene terephthalate fabric and polyethylene naphthalate fabric.

Rubber materials forming the cover layer of the hoses can also be compounded from various elastomers, including CR, EPM, EPDM, CPE, NBR, HNBR, IIR, CIIR, BIIR, BIMS, AEM as well as polymer blends of these. In some embodiments, CIIR or EPDM are useful rubber materials for the cover layer. In some aspects, the cover layer may be from 0.03 inch (0.762 mm) to 0.06 inch (1.524 mm) in thickness.

The various material components utilized in the hose embodiments of this disclosure can be cured with conventional peroxide curatives. For example peroxides such as dicumyl peroxide, α-a-bis(t-butylperoxide)diisopropylbenzene, benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy) valerate can be employed in curing the rubber components of the hose. The most preferred and commercially available peroxide curatives are Percadox™ 14/40 from Noury Chemical Corporation and Vul-Cup™ from Penwalt Corporation. From 1 to about 10 parts of peroxide are generally utilized based on 100 parts of base polymer. Peroxides are preferred as the curative since they are less sensitive to premature crosslinking (scorch). The rubbery components employed in the hose of this invention can also contain various additives in conventional or suitable amounts. Such additives may include, and are not limited to retardants to prevent an unduly quick cure, antioxidants, processing aids, reinforcing agents and fillers, such as carbon black, silica, and the like.

The adhesive systems useful in adhering the various component layers to other component layers in accordance with this invention are the conventionally known adhesive systems for use with peroxide cured elastomers. For example, maleinized 1,2-polybutadiene resin, and various plasticizers.

In some embodiments, a metal foil layer may be incorporated into the barrier hose, while in other embodiments, the hose is devoid of a metal foil layer. When used, the metal foil layer may be like or similar to those described in US Pat. App. Pub. No. 2015/0075665, the disclosure of which is incorporated herein by reference thereto.

Figure 2:
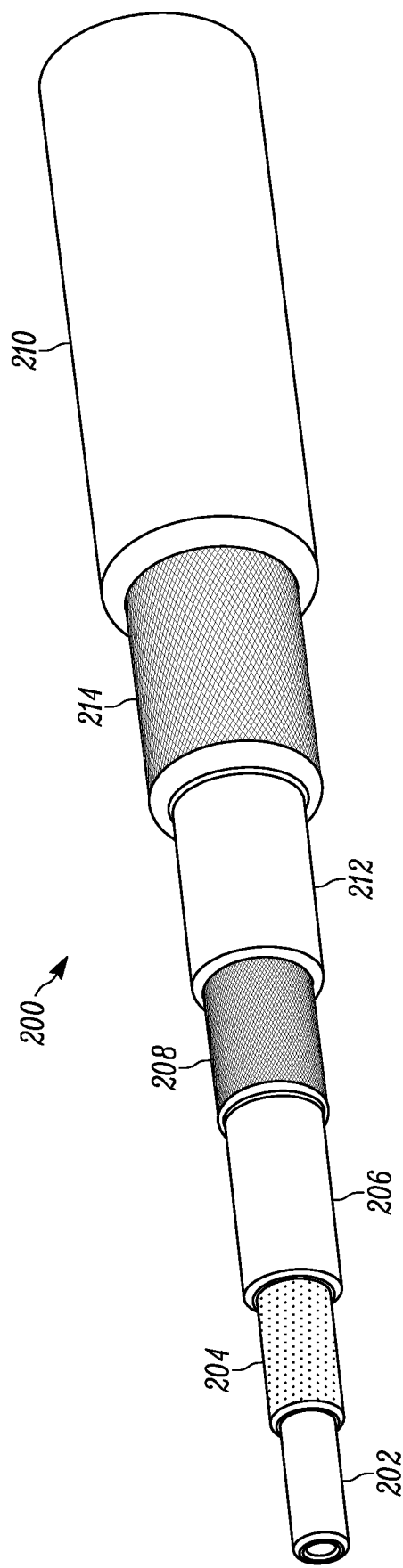
FIG. 2 depicts another barrier hose in a cut away perspective view, in accordance with the disclosure; and, FIG. 3 shows an arrangement in a cross-sectional view, in accordance with the disclosure.

Now referencing FIGS. 1 and 2, which depict some hose embodiments in accordance with the disclosure. FIG. 1 illustrates a barrier hose 100, in a cut away perspective view. Hose 100 includes an innermost rubber tube 102 which is surrounded by a barrier layer 104. Disposed adjacent barrier layer 104 is a tie layer 106 which has a reinforcing layer 108 disposed outwardly therefrom. Cover layer 110 is the outermost layer of hose 100. Generally, prior to mating barrier layer 104 with innermost rubber tube 102, the inner surface, or wall, of the barrier layer is exposed to ozone to oxidize the inner surface of the barrier layer, thus providing a barrier layer which is a heterogeneous surfaced layer. As used herein, the phrase "heterogeneous surfaced layer" is meant to indicate that the barrier layer has an inner surface and an outer surface, and the inner surface has a first surface energy which is higher than the surface energy of the outer surface of the barrier layer. The surface energy of the outer surface will be referred to as a second surface energy.

Now referencing FIG. 2 which illustrates a spiral barrier hose 200, in a cut away perspective view. Hose 200 includes an innermost rubber tube 202 which is surrounded by a barrier layer 204. Disposed adjacent the barrier layer 204 is a tie layer 206 which has a spiral reinforcing layer 208 disposed outwardly therefrom. Surrounding the spiral reinforcing layer 208 is a second tie layer 212 which has second spiral reinforcing layer 214 disposed thereupon. Cover layer 210 is the outermost layer of hose 200. As described for hose 100 above, prior to mating barrier layer 204 with innermost rubber tube 202, the inner surface, or wall, of the barrier layer is exposed to ozone to oxidize the inner surface of the barrier layer, providing a barrier layer which is a heterogeneous surfaced layer.

Figure 3:
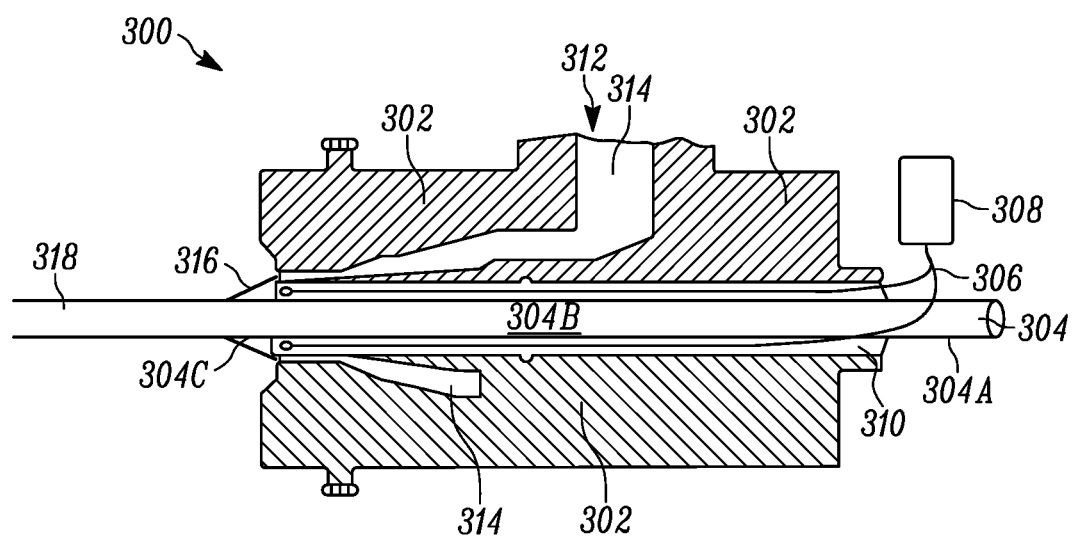

Now referencing FIG. 3 which illustrates yet another aspect of the disclosure. In FIG. 3, an arrangement 300 includes an extruder crosshead 302 as well as an innermost rubber tube 304 having an input portion 304A, a resident portion 304B, and an output portion 304C, where the resident portion 304B resides within extruder crosshead 302. Arrangement 300 is a component of a hose production facility for constructing hoses, such as those described above in FIGS. 1 and 2, as well as other similar hoses, which are generally known to those of skill in the art. Arrangement 300 further includes an ozone stream 306 evolved from an ozone source 308, and ozone stream 306 is introduced into ozone cavity 310. Ozone source 308 may be any suitable source of ozone, for example an ozone generator, ozone stored in a cylinder, and the like.

Arrangement 300 further includes a molten barrier forming material, such as a polyamide melt stream 312, which is movable through a flow cavity, such as polyamide flow cavity 314. Ultimately, the molten barrier forming material is emitted from the extruder crosshead 302, and exposed to ozone stream 306 on an under side, for example, polyamide 316 which ultimately is a heterogeneous surfaced layer when mating with innermost rubber tube 304. The combination of polyamide 316 mated with innermost rubber tube 304 is polyamide coated rubber tube 318.

The effect of flooding the back cavity 310 of the crosshead 302 with ozone 306 oxidizes and increases the surface energy of the molten polyamide 312 before it cools and stretches over innermost rubber tube 304. As such, the inner surface of the molten polyamide 312 has a significantly higher surface energy than an untreated surface of the molten polyamide 312. Such increase in surface energy strengthens the adhesive properties with the innermost rubber tube 304.

In addition to those embodiments described above, the inventive concepts of the disclosure may be used for any articles which would have improved properties by application of ozone to surfaces where oxidation and/or increased surface energy can improve wetting and/or adhesion, such as but not limited to textile cord or fabric prior to dip treatment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS (PART OF THE DESCRIPTION)

100 Barrier hose
200 Spiral barrier hose
102, 202 Innermost rubber tube
104, 204 Barrier layer
106, 206 Tie layer
108, 208 Reinforcing layer
110, 210 Cover layer
212 Second tie layer
214 Second spiral reinforcing layer
300 Extruder and hose arrangement
302 Extruder crosshead
304 Innermost rubber tube
304A Input portion of innermost rubber tube
304B Resident portion of innermost rubber tube
304C Output portion of innermost rubber tube
306 Ozone stream
308 Ozone source
310 Ozone cavity
312 Polyamide melt stream
314 Polyamide flow cavity
316 Ozone expose polyamide application onto input tube—or—rubber tube 304
318 Polyamide barrier coated tube—or—rubber tube 304

What is claimed is:

1. An arrangement for oxidizing a surface of a molten barrier layer, the arrangement comprising:
   an extruder crosshead having a tube input portion at a first end, a tube output portion at a second end opposite the first end, an ozone cavity extending from the tube input portion to the tube output portion, and a molten flow cavity connected to the tube output portion;
   an inner rubber tube having an input portion a resident portion residing in the extruder crosshead, and an output portion;
   an ozone stream evolved from an ozone source, wherein the ozone stream is introduced into the ozone cavity of the extruder crosshead at the tube input portion of the extruder crosshead;
   a continuous molten barrier forming material which is movable through the molten flow cavity in the extruder crosshead; and
   a portion of the continuous molten barrier forming material introduced at the tube output portion from the molten flow cavity and exposed to the ozone stream on an inner side of the portion of the continuous molten barrier forming material to oxidize the inner side and increase a surface energy of an inner side of the continuous molten barrier forming layer to provide a heterogeneous surfaced barrier layer having an inner surface and an outer surface, where the inner surface has a higher surface energy than the outer surface.

2. The arrangement according to claim 1, wherein the ozone source is an ozone generator or ozone stored in a cylinder and the ozone source is configured to introduce the ozone stream into the ozone cavity.

3. The arrangement according to claim 1, wherein the continuous molten barrier forming material is comprised of a polyamide material.

4. The arrangement according to claim 1, wherein the extruder crosshead is configured to form a barrier coated rubber tube comprised of the heterogeneous surfaced barrier layer and the output portion of the inner rubber tube, wherein the heterogeneous surfaced barrier layer is disposed outward from the output portion of the inner rubber tube.

5. The arrangement according to claim 1, wherein the extruder crosshead is configured to expose only the inner side of the continuous molten barrier forming layer to the ozone stream and not expose an outer side of the continuous molten barrier forming layer to the ozone stream and to stretch the continuous molten barrier forming material onto an outer surface of the inner rubber tube.

6. The arrangement according to claim 1, wherein the extruder crosshead is further configured to form a tie layer on an outer surface of the barrier coated rubber tube.

7. The arrangement according to claim 6, wherein the extruder crosshead is further configured to form a reinforcing layer disposed upon the tie layer.

8. The arrangement according to claim 7, wherein the extruder crosshead is further configured to form a cover layer disposed outward from the reinforcing layer.

9. The arrangement according to claim 8, wherein the cover layer is comprised of ethylene-propylene-diene monomer rubber.

10. The arrangement according to claim 1, wherein the inner rubber tube is comprised of rubbery polymer.

11. The arrangement of claim 1, the arrangement configured to form a barrier hose having a barrier layer surrounding an innermost rubber tube, wherein the barrier layer has the inner surface and the outer surface and a cover layer which is disposed outward from and proximate to the barrier layer.

12. The arrangement of claim 11, the barrier hose further comprising a first tie layer adjacent the barrier layer and inward from the cover layer.

13. The arrangement of claim 12, the barrier hose further comprising a first reinforcing layer between the tie layer and the cover layer.

14. The arrangement of claim 13, the barrier layer is comprised of a polyamide material.

15. The arrangement of claim 13, the barrier hose further comprising a second tie layer adjacent the first reinforcing layer and inward from the cover layer.

16. The arrangement of claim 15, the barrier hose further comprising a second reinforcing layer between the second tie layer and the cover layer.

\* \* \* \* \*